(12) United States Patent
Strashny

(10) Patent No.: US 11,881,653 B2
(45) Date of Patent: Jan. 23, 2024

(54) SYSTEM AND METHOD FOR POSITIONING A CONDUCTIVE ROD POWERING A WORK MACHINE

(71) Applicant: Caterpillar Inc., Peoria, IL (US)

(72) Inventor: Igor Strashny, Tucson, AZ (US)

(73) Assignee: Caterpillar Inc., Peoria, IL (US)

( * ) Notice: Subject to any disclaimer, the term of this patent is extended or adjusted under 35 U.S.C. 154(b) by 237 days.

(21) Appl. No.: 17/535,162

(22) Filed: Nov. 24, 2021

(65) Prior Publication Data

US 2023/0163526 A1 May 25, 2023

(51) Int. Cl.
*H01R 13/631* (2006.01)
*B60L 50/60* (2019.01)

(52) U.S. Cl.
CPC .......... *H01R 13/6315* (2013.01); *B60L 50/60* (2019.02); *B60L 2200/40* (2013.01); *H01R 2201/26* (2013.01)

(58) Field of Classification Search
CPC ...... B60L 50/60; B60L 50/53; B60L 2200/40; H01R 13/6315; H01R 13/26; H01R 2201/26; E02F 9/207; E02F 9/22
See application file for complete search history.

(56) References Cited

U.S. PATENT DOCUMENTS

| 5,397,240 A | 3/1995 | Herard |
| 6,750,399 B1 | 6/2004 | Daumling |
| 7,892,038 B1 * | 2/2011 | Kataoka ............. H01R 13/6215 439/660 |
| 8,872,026 B2 | 10/2014 | Guyader et al. |
| 8,925,405 B2 | 1/2015 | Kawabuchi et al. |
| 8,978,852 B2 | 3/2015 | Andre et al. |
| 9,870,845 B2 | 1/2018 | Nagahashi |

(Continued)

FOREIGN PATENT DOCUMENTS

| CN | 201516809 | 6/2010 |
| CN | 101947920 A | 1/2011 |

(Continued)

OTHER PUBLICATIONS

Written Opinion and International Search Report for Int'l. Patent Appln. No. PCT/US2022/080287, dated Apr. 11, 2023 (9 pgs).

*Primary Examiner* — Marcus E Harcum

(57) ABSTRACT

A work machine powered electrically by a conductor rod includes a pneumatic control system for moving the conductor rod axially to contact power rails along a haul route. The conductor rod has a central passageway pneumatically coupling a head to a tip. A barrel extending from the head and an arm extending from the tip have concentric tubular conductors radially offset from each other and slidably mated together. Arrangements of pneumatic control valves provide pressurized air to selected cavities formed at ends or sides of the tubular conductors, causing axial forces that are balanced to effect retraction and extension of the arm within the barrel. In an open-loop mode, the pneumatic control system enables attachment of the arm to the power rails. In a closed-loop mode, mechanical feedback of relative position between the arm and power rails leads to axial adjustment pneumatically so that contact with electrical power is maintained despite lateral movements caused by steering or road conditions.

20 Claims, 5 Drawing Sheets

(56) References Cited

U.S. PATENT DOCUMENTS

| | | |
|---|---|---|
| 10,053,096 B2 | 8/2018 | Schunk et al. |
| 10,137,785 B2 | 11/2018 | Vahle et al. |
| 10,232,719 B2 | 3/2019 | Tajima |
| 10,682,884 B1* | 6/2020 | Pierce ................ B60B 35/122 |
| 2010/0252345 A1* | 10/2010 | Hoshino ............... B60L 50/53 303/152 |
| 2012/0189374 A1 | 7/2012 | Lanting et al. |
| 2012/0244755 A1* | 9/2012 | Suzuki ................ H01R 13/64 439/660 |
| 2012/0291752 A1* | 11/2012 | Hackett ............ F02D 19/0689 123/445 |
| 2013/0037622 A1* | 2/2013 | Kim .................. F02D 19/0684 239/413 |
| 2014/0345904 A1 | 11/2014 | Nagahashi |
| 2015/0288094 A1* | 10/2015 | Lerner ................ H01R 13/005 156/60 |
| 2017/0106767 A1 | 4/2017 | Tajima et al. |
| 2017/0210238 A1 | 7/2017 | Buehs et al. |
| 2018/0282975 A1* | 10/2018 | Kawamura ......... F16L 27/0804 |
| 2020/0173408 A1* | 6/2020 | Kim ..................... F02M 47/027 |
| 2020/0180714 A1* | 6/2020 | Umbach .............. B62D 55/088 |
| 2020/0217047 A1 | 7/2020 | Sherlock |
| 2020/0271229 A1* | 8/2020 | Feng ........................ B21K 1/20 |
| 2021/0138593 A1 | 5/2021 | Guisasola |

FOREIGN PATENT DOCUMENTS

| | | |
|---|---|---|
| CN | 204452108 U | 7/2015 |
| CN | 107215238 A | 9/2017 |
| CN | 211543283 U | 9/2020 |
| EP | 2284635 A | 2/2011 |
| JP | 6691672 B2 | 5/2020 |
| WO | WO2009007879 A2 | 1/2009 |
| WO | 2020170188 A1 | 8/2020 |
| WO | WO2020186296 A1 | 9/2020 |

\* cited by examiner

SYSTEM AND METHOD FOR POSITIONING A CONDUCTIVE ROD POWERING A WORK MACHINE

TECHNICAL FIELD

The present disclosure relates to a system and method for axially positioning a conductive rod that conveys electrical power to a moving vehicle. More specifically, the present disclosure relates to a conductive rod for an electrically powered work machine, a process for pneumatically extending and retracting the conductive rod to maintain connection with a roadside power source, and the work machine using the conductive rod.

BACKGROUND

Heavy work machines, such as earth-moving vehicles or hauling trucks, require significant power to carry out their functions. The machines themselves can be of substantial weight, and their loads require large amounts of power to move. Diesel engines typically provide that power, but they can have disadvantages. For instance, in some implementations, heavy work machines may need to travel large distances through rugged terrain. At a remote mining site, for example, groups of these machines are often employed to ferry extreme loads along roadways, or haul routes, extending between various locations within the mining site. Supplies of diesel fuel may be far away from such locations or not easily delivered to such locations. In addition, the groups of diesel machines can generate significant pollution.

Electrical power has been used to supplement these diesel engines while the work machines move. In some environments, the electrical power is delivered from wires over the haul route to a pantograph on the work machine as the machine travels the haul route, as in a cable car. But overhead wires cannot reliably provide sufficient electrical energy to power a heavy work machine during long movements. Nor can the overhead delivery provide enough current to charge backup batteries for an electric machine at the same time. In addition, connection with overhead wires tolerates only small lateral movements by the vehicle before arcing or disconnection occurs. As a result, electrical power provided through overhead wires typically supplements, rather than replaces, power generated by diesel engines in heavy work machines.

In other environments, on the other hand, a power rail based on the ground may provide electrical power to heavy work machines. Establishing an electrical connection with a power rail can require precise movements of a conductor from a heavy work machine, however, and maintaining an electrical connection with a power rail while a heavy work machine moves can be particularly challenging. In locations such as a mining site, the haul route may be uneven, hilly, and pocked. These variations may lead to irregular movements by the machine or unexpected changes in position by the power rail, causing the machine to disconnect from the rail. Steering deviations for the heavy work machine could also disrupt the connection of the machine with the power rail, detracting from the value of rail-based delivery of electrical power.

One approach for providing electrical power to a vehicle through a rigid conductor is described in U.S. Patent App. Pub. No. 2017/0106767A1 ("the '767 application"). The '767 application describes a vehicle power supply method in which a charging arm of fixed length is deployed transversely from a vehicle to contact a power supplying apparatus. To reach the power supplying apparatus with the arm, a device is caused to slide along the side of the vehicle, which forces a damper unit to push the arm around an axis of rotation and displace its end outwardly from the vehicle. A rotating arm of fixed length, as described in the '767 application, however, has a limited reach from the side of the vehicle, which limits the lateral movement available in steering. Moreover, support for the arm is essentially limited to one end of the arm at the axis of rotation, which may be inadequate to support a long arm of substantial weight. Such a mechanism would also be prone to failure when used in harsh conditions such as mine sites, paving sites, and construction sites. As a result, the system described in the '767 application is not desirable for heavy work machines having high electrical power loads or operating in environments in which the machines may substantially deviate along their paths when moving.

Examples of the present disclosure are directed to overcoming deficiencies of such systems.

SUMMARY

In an aspect of the present disclosure, a work machine includes an electric engine, an air compressor, and a conductor rod extending along a longitudinal axis from a first end proximate the work machine to a second end spaced laterally from the work machine. The conductor rod has a central passageway extending circumferentially around the longitudinal axis pneumatically coupling the first end to the second end. The conductor rod has a first cylindrical shell extending from the first end toward the second end and having a first diameter, a first stop attached to the first cylindrical shell, and a first sequence of first conductive tubes and first tubular cavities concentrically positioned alternatingly around the central passageway with the first conductive tubes extending from the first end. The conductor rod further has a second cylindrical shell extending from the second end toward the first end and having a second diameter different from the first diameter, a second stop attached to the second cylindrical shell, and a second sequence of second conductive tubes and second tubular cavities concentrically positioned alternatingly around the central passageway with the second conductive tubes extending from the second end. The first cylindrical shell and the second cylindrical shell are slidably mated along the longitudinal axis, where the first conductive tubes are slidable into the second tubular cavities, and the second conductive tubes are slidable into the first tubular cavities. A retraction cavity is positioned between the first cylindrical shell and the second cylindrical shell and between the first stop and the second stop, and a channel connects the air compressor to at least the retraction cavity. The work machine also includes an open-loop directional control valve configured, in a default state, to couple a first cavity of the first tubular cavities to atmosphere and, in an active state, to couple the first cavity to the channel.

In another aspect of the present disclosure, an apparatus for conducting electrical power to a work machine includes a conductor rod having a central passageway around a longitudinal axis that pneumatically connects a base to a tip of the rod. A pneumatic cylinder extends from the base toward the tip and terminates at a cylinder end. The pneumatic cylinder includes cylinder tubes, made of conductive material concentrically positioned around the central passageway and extending from the base to proximate the cylinder end, and cylinder cavities between the cylinder tubes. A piston extends from the tip toward the base and terminates at a piston end. The piston includes piston tubes, made of conductive material concentrically positioned around the central passageway and extending from the tip to proximate the piston end, and piston cavities between the piston tubes. The cylinder tubes are radially offset from the piston tubes, and the piston is slidably mated within the pneumatic cylinder. The conductor rod further includes a retraction cavity enclosed between an inner surface of the pneumatic cylinder and an outer surface of the piston. The apparatus also includes an open-loop directional control valve configured to couple at least one of the cylinder cavities to a first inlet or couple the at least one of the cylinder cavities to atmosphere, as well as a channel coupled to the first inlet, to the retraction cavity, and to the central passageway.

In yet another aspect of the present disclosure, a method includes providing pressurized air from a compressor within a work machine to a conductor rod on the work machine and causing a piston, slidingly engaged within a pneumatic cylinder of the conductor rod, to extend along a longitudinal axis from the pneumatic cylinder in an open-loop mode. The pneumatic cylinder has cylinder tubes concentrically positioned around a central passageway, and the piston has piston tubes concentrically positioned around the central passageway and radially offset from the cylinder tubes. Causing the piston to extend includes feeding the pressurized air into an annular retraction cavity of the conductor rod positioned between an inner wall of the pneumatic cylinder and an outer wall of the piston and pneumatically coupling an annular cylinder cavity to the pressurized air. The annular cylinder cavity is positioned near a base of the conductive rod proximate the work machine and is bounded in the pneumatic cylinder by successive cylinder tubes and a piston tube slidably mated between the successive cylinder tubes. An extension area around a first radial surface in the annular cylinder cavity is larger than a retraction area around a second radial surface in the annular retraction cavity.

DETAILED DESCRIPTION

Figure 1:
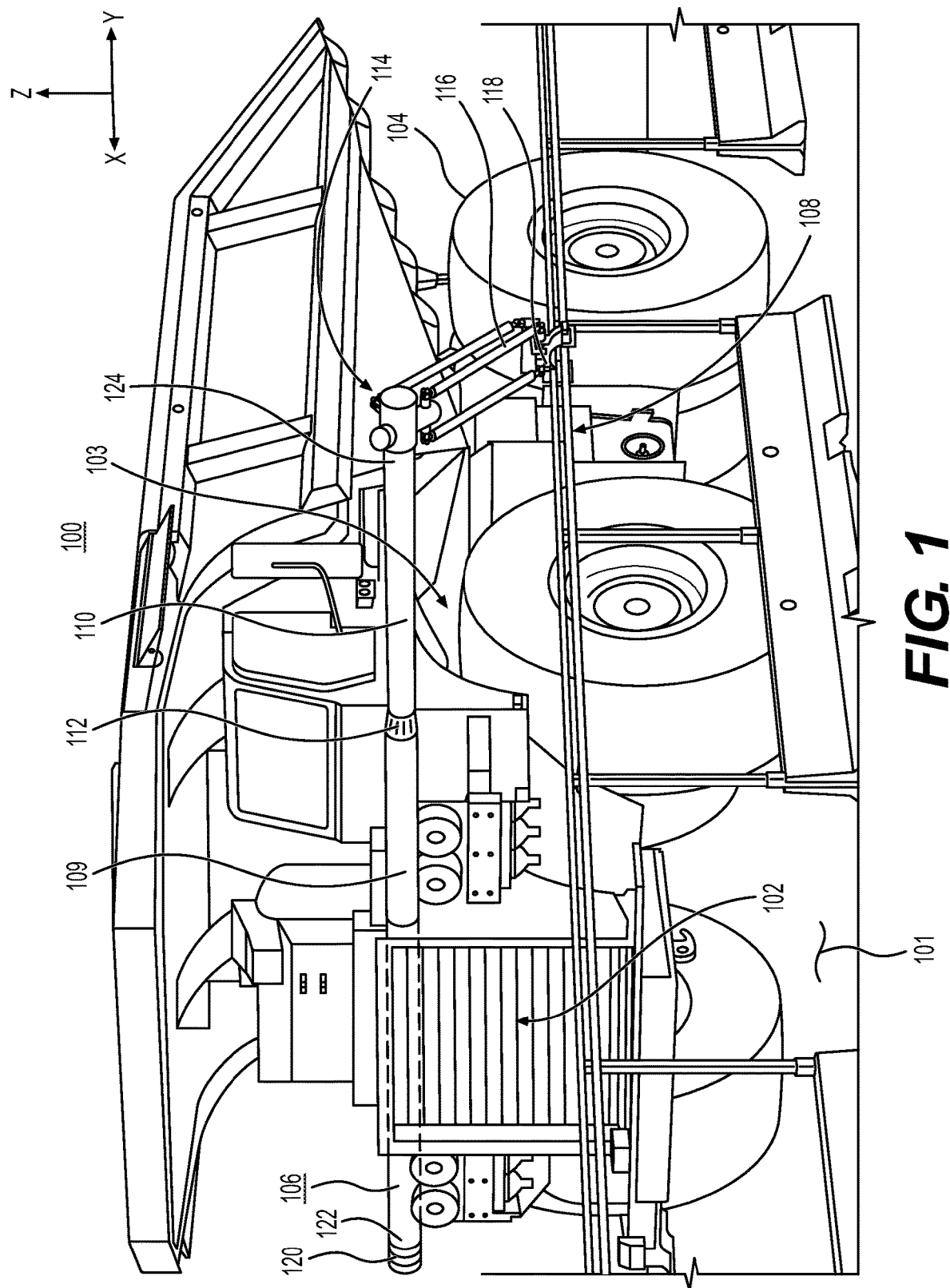
FIG. 1 is a schematic illustration of an electrically powered work machine coupled to a roadside power source via a conductive rod, connector, and trailing arms in accordance with an example of the present disclosure.

Wherever possible, the same reference numbers will be used throughout the drawings to refer to same or like parts. FIG. 1 illustrates an isometric view of a work machine 100 within an XYZ coordinate system as one example suitable for carrying out the principles discussed in the present disclosure. Exemplary work machine 100 travels parallel to the X axis along a roadway, also termed a haul route 101, typically from a source to a destination within a worksite. In one implementation as illustrated, work machine 100 is a hauling machine that hauls a load within or from a worksite within a mining operation. For instance, work machine 100 may haul excavated ore or other earthen materials from an excavation area along haul route 101 to dump sites and then return to the excavation area. In this arrangement, work machine 100 may be one of many similar machines configured to ferry earthen material in a trolley arrangement. While a large mining truck in this instance, work machine 100 may be any machine that carries a load between different locations within a worksite, examples of which include an articulated truck, an off-highway truck, an on-highway dump truck, a wheel tractor scraper, or any other similar machine. Alternatively, work machine 100 may be an off-highway truck, on-highway truck, a dump truck, an articulated truck, a loader, an excavator, a pipe layer, or a motor grader. In other implementations, work machine 100 need not haul a load and may be any machine associated with various industrial applications including, but not limited to, mining, agriculture, forestry, construction, and other industrial applications.

Referring to FIG. 1, and relevant to the present disclosure, an example work machine 100 includes a frame 103 powered by electric engine 102 to cause rotation of traction devices 104. Traction devices 104 are typically four or more wheels with tires, although tracks or other mechanisms for engagement with the ground along haul route 101 are possible. Electric engine 102 functions to provide mechanical energy to work machine 100 based on an external electrical power source, such as described in further detail below. An example of mechanical energy provided by electric engine 102 includes propelling traction devices 104 to cause movement of work machine 100 along haul route 101, but electric engine 102 also includes components sufficient to power other affiliated operations within work machine 100. For instance, in some implementations, electric engine 102 includes equipment for converting electrical energy to provide pneumatic or hydraulic actions within work machine 100. While electric engine 102 is configured to operate from an external electrical power source, electric engine 102 typically includes one or more batteries for storing electrical energy for auxiliary or backup operations.

In accordance with the principles of the present disclosure, work machine 100 further includes a conductor rod 106 configured to receive electrical power from a power rail 108. In some examples, power rail 108 is one or more beams of metal arranged substantially parallel to and a distance above the ground. In FIG. 1, power rail 108 is positioned to be substantially parallel to the X axis and the direction of travel of work machine 100. Support mechanisms hold power rail 108 in place along a distance at the side of haul route 101 for work machine 100 to traverse. The support mechanisms and power rail 108 may be modular in construction, enabling their disassembly and reassembly at different locations or their repositioning along the existing haul route 101. In many examples, such as within a mining site, power rail 108 will not be configured continuously at a fixed distance along a side of haul route 101 and at a fixed height above the ground due, at least in part, to the variation of the terrain. Therefore, it is expected that the vertical, horizontal, and angular positions of the surface of power rail 108 in the XYZ planes will vary along haul route 101. Moreover, while shown in FIG. 1 to the left of work machine 100 as work machine 100 travels in the direction of the X axis, power rail 108 may be installed to the right of work machine 100 or in other locations suitable to the particular implementation.

Power rail 108 provides a source of electrical power for work machine 100 as either AC or DC. In some examples, power rail 108 has two or more conductors, each providing voltage and current at a different electrical pole. In one implementation (e.g., an implementation in which the power rail 108 includes three conductors), one conductor provides positive DC voltage, a second conductor provides negative DC voltage, and a third conductor provides 0 volts relative to the other two conductors. The two powered conductors within power rail 108 provide +1500 VDC and −1500 VDC. These values are exemplary, and other physical and electrical configurations for power rail 108 are available and within the knowledge of those of ordinary skill in the art.

Conductor rod 106 enables electrical connection between work machine 100 and power rail 108, including during movement of work machine 100 along haul route 101. In the example shown in FIG. 1, conductor rod 106 is an elongated arm resembling a pole. FIG. 1 shows conductor rod 106 positioned along a front side of work machine 100, with respect to the direction of travel of work machine 100 in the direction of the X axis. In this arrangement, conductor rod 106 is located in FIG. 1 in the Y-Z plane essentially along the Y axis with a first end near a right side of work machine 100 and a second end at a left side of work machine 100. Conductor rod 106 may be attached to any convenient location within work machine 100, such as to frame 103, in a manner to couple conductor rod 106 to power rail 108. Shown in FIG. 1 as extending to a left side of work machine 100 toward power rail 108, conductor rod 106 may alternatively be arranged to extend to a right side and at any desired angle from work machine 100 such that conductor rod 106 may be coupled to power rail 108 for obtaining electrical power.

As embodied in FIG. 1, conductor rod 106 includes a barrel 109 mounted to frame 103 of work machine 100. Barrel 109 has a hollow interior and may be a conductive metal having suitable mechanical strength and resiliency, such as aluminum. Within barrel 109, an arm 110 is retained. Arm 110 is slidably engaged within conductor rod 106 such that it may be extended or retracted axially, i.e., along the Y axis in FIG. 1, to adjust the reach of conductor rod 106. Specifically, in a retracted position, arm 110 is caused to slide within barrel 109 of conductor rod 106 such that a length of conductor rod 106 roughly spans the width of work machine 100. A junction 112 serves as the junction or interface between arm 110 and barrel 109, which is the main body of conductor rod 106. When arm 110 is fully retracted or collapsed into barrel 109, junction 112 essentially becomes the left edge of conductor rod 106. On the other hand, when arm 110 is extended from barrel 109 of conductor rod 106, arm 110 may reach from work machine 100 to proximate power rail 108 on the side of haul route 101.

Within, and possibly including barrel 109, conductor rod 106 includes a series of electrical conductors passing longitudinally, at least from a head 122 at a proximal end to a tip 124 at a distal end. Typically, the conductors within conductor rod 106 are formed of a metallic material and are rigid. In some examples, the conductors are concentric tubes, or hollow cylinders, of solid metal such as aluminum nested together and sized to provide electrical capacity sufficient for powering work machine 100. Tubular conductors within arm 110 slidably engage with corresponding tubular conductors within barrel 109 to maintain electrical continuity as arm 110 is extended or retracted.

At a distal end of work machine 100 at tip 124, a connector assembly 114 provides an interface to power rail 108 via trailing arms 116 and contactor 118. Power rail 108 is typically arranged along a side of haul route 101, and work machine 100 is steered so that it traverses haul route 101 substantially in parallel with power rail 108. Thus, in reference to FIG. 1, power rail 108 and a travel path for work machine 100 are substantially in parallel with each other and with the X axis. Contactor 118 is configured to maintain an electrical connection with power rail 108 while sliding along its surface in the direction of the X axis as work machine 100 moves. In some examples, trailing arms 116 are conductors coupled to contactor 118, each conducting voltage and current at a different electrical pole and corresponding to the conductors within conductor rod 106. In operation, electrical power is accessed from power rail 108 via contactor 118, which remain in contact during movement of work machine 100, and the electrical power is conducted through trailing arms 116 into connector assembly 114.

From connector assembly 114, the electrical power is conveyed at tip 124 through the nested tubular conductors within arm 110 and barrel 109 to head 122 of conductor rod 106 and through a head-end interface 120 to work machine 100. Head-end interface 120 provides at least an electrical connection between conductor rod 106 and work machine 100 for powering electric engine 102 and otherwise enabling operations within work machine 100. In some examples, head-end interface 120 may also provide an interface for inputs to control mechanical operation of conductor rod 106, such as passageways for pressurized air of a pneumatic control system to extend and retract arm 110 or signaling for electronic controls.

Figure 2:
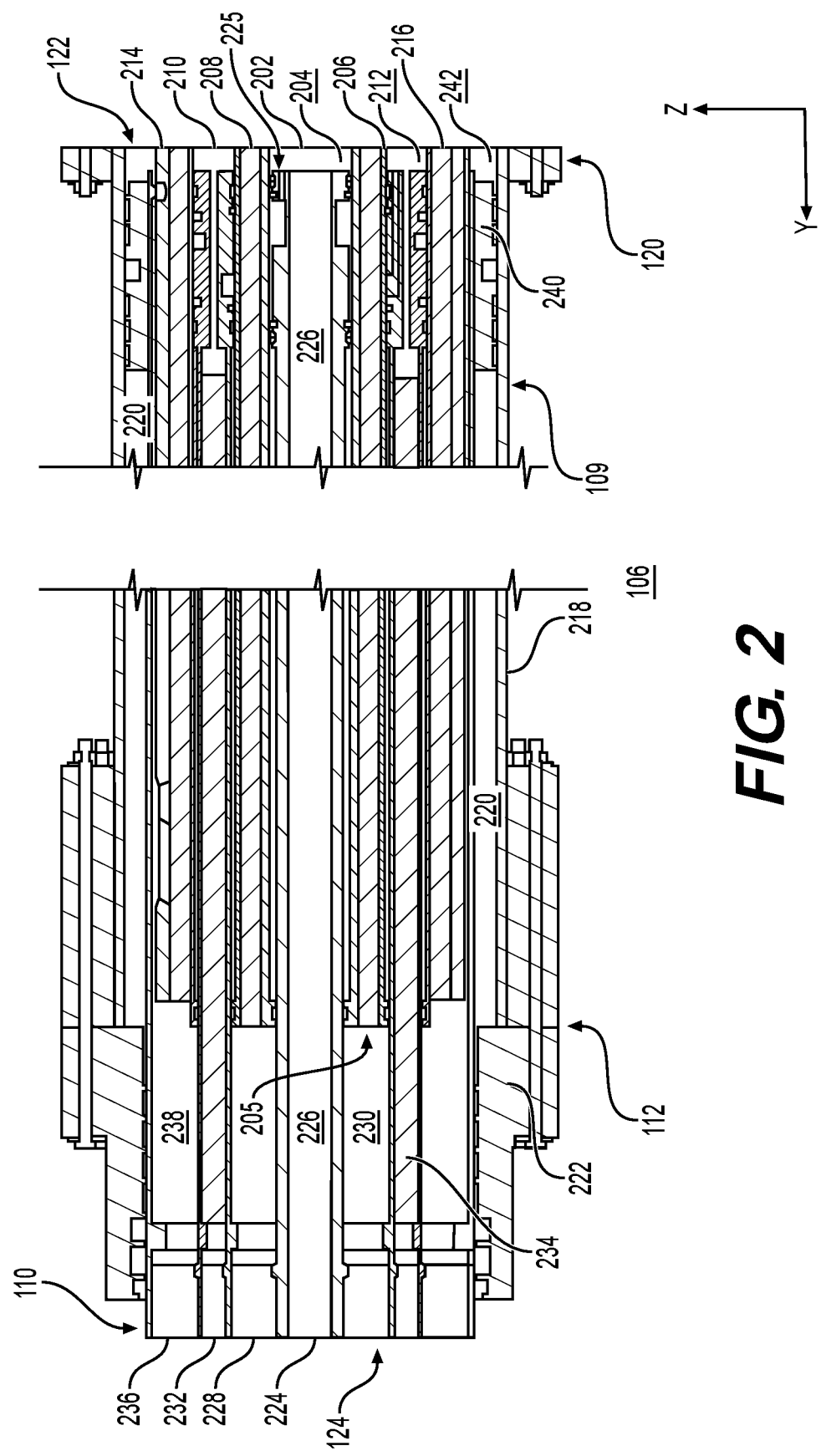
FIG. 2 is a longitudinal section of a rear view of the conductive rod of FIG. 1 when retracted in accordance with an example of the present disclosure.

Focusing more on conductor rod 106 from FIG. 1, FIG. 2 illustrates a longitudinal section of conductor rod 106 when arm 110 is retracted, or collapsed, into barrel 109. More specifically, FIG. 2 depicts a longitudinal section of conductor rod 106 between head-end interface 120 and connector assembly 114, from head 122 to tip 124, when viewed facing in the direction of travel for work machine 100, i.e., in the direction of the X axis. Thus, conductor rod 106 lies in the Y-Z plane, as indicated in FIG. 2.

Referring to the right side of FIG. 2, barrel 109 contains an arrangement of concentric conductors of tubular shape, i.e., as hollow cylinders. In this example, from the axial center outward, first cylinder conductor 202 is positioned at a center of barrel 109 and is a tubular conductor made of aluminum or a similar metal with high electrical conductivity and high mechanical strength. For instance, an aluminum alloy such as 6061-T6 may be used for first cylinder conductor 202 and other conductive tubes in conductor rod 106. In some examples, first cylinder conductor 202 has an outer diameter of approximately 3.5 inches. First cylinder conductor 202 begins at head 122 and extends axially along conductor rod 106 around a longitudinal Y axis to a barrel end 205. Barrel end 205 in this example of FIG. 2 is approximately radial to junction 112. As a tube, first cylinder conductor 202 defines first cylinder cavity 204 within its inner surface. If arm 110 were removed from barrel 109 in FIG. 2, first cylinder cavity 204 would be an open space within first cylinder conductor 202 traveling the length of conductor rod 106 from head 122 to barrel end 205. In one example, first cylinder cavity 204 has a diameter of about 2.5 to 3 inches.

A second cylinder conductor 206 concentrically surrounds first cylinder conductor 202. As with first cylinder conductor 202, second cylinder conductor 206 is a tubular conductor made of aluminum or a similar metal with high electrical conductivity and high mechanical strength. Second cylinder conductor 206 is similarly positioned around a Y axis within FIG. 2 and spans a distance from head 122 to barrel end 205. In one example, second cylinder conductor 206 has an outer diameter of about 5 to 5.5 inches. These dimensions, as well as other dimensions discussed below, are merely examples and could be greater or lesser than the stated values. Being arranged concentrically around and, by definition, having a larger diameter than first cylinder conductor 202, second cylinder conductor 206 forms a radial gap between it and first cylinder conductor 202. In the example of FIG. 2, that gap is filled by second cylinder insulation 208, which is a closed cell polyurethane foam. Other types of materials for second cylinder insulation 208 that provide electrical insulation and lightweight support within conductor rod 106 will be available and apparent to those of ordinary skill in the field. In some examples, second cylinder insulation 208 has a thickness of about 0.75 inches.

Moving farther out radially on the right side of FIG. 2, third cylinder conductor 210 concentrically surrounds second cylinder conductor 206 and first cylinder conductor 202. Third cylinder conductor 210 is a tubular conductor made of aluminum or a similar metal with high electrical conductivity and high mechanical strength. As with the other tubes discussed, third cylinder conductor 210 extends from head 122 to barrel end 205 within conductor rod 106. In one example, third cylinder conductor 210 has an outer diameter of about 8 to 9 inches. A third cylinder cavity 212 between second cylinder conductor 206 and third cylinder conductor 210 is an open space, which, if arm 110 were removed from barrel 109 in FIG. 2, would form a tubular cavity extending from head 122 to barrel end 205.

Concentrically around third cylinder conductor 210 and the other tubular conductors, fourth cylinder conductor 214 forms an outer conductive path from head 122 to barrel end 205. Similarly, fourth cylinder conductor 214 is a tubular conductor made of an aluminum alloy or a similar metal with high electrical conductivity and high mechanical strength. In one example, fourth cylinder conductor 214 has an outer diameter of about 14 inches. A gap between an outer diameter of third cylinder conductor 210 and an inner diameter of fourth cylinder conductor 214, in some examples, is about 0.75 inches and is filled with fourth cylinder insulation 216, which is a closed cell polyurethane foam or similar substance.

Radially beyond fourth cylinder conductor 214, a covering or barrel shell 218 encases conductor rod 106. Barrel shell 218 is typically a metal or similar substance providing structural integrity to conductor rod 106. Barrel shell 218 has an inner diameter in excess of an outer diameter of fourth cylinder conductor 214. As a result, a retraction cavity 220 of a tubular shape is formed between fourth cylinder conductor 214 and barrel shell 218 that extends from head 122 to barrel end 205. A stop 222, which is part of a housing for conductor rod 106 at junction 112, defines a longitudinal end for retraction cavity 220 away from head 122. Stop 222 generally aligns radially with barrel end 205 and junction 112.

The various annular or tubular cavities within barrel 109, namely, first cylinder cavity 204, third cylinder cavity 212, and the head end of retraction cavity 220 (barrel shell cavity 242, described below), are sealed or capped by the attachment of head-end interface 120 to their ends at head 122. The attachment of head-end interface 120 is such as to provide an airtight seal within these cavities, for purposes to be understood further below.

Viewing FIGS. 1 and 2 together, arm 110 is a substantially cylindrical body having a smaller outer diameter than an inner diameter of barrel shell 218 and that mates and slides into barrel 109. As well as providing a longitudinal end for retraction cavity 220, stop 222 also defines an inner diameter through which arm 110 slides, as shown to the left of FIG. 2. By sliding, it is meant that arm 110 may move longitudinally along the Y axis in connection with one or more surfaces within barrel 109 as arm 110 is moved axially with respect to conductor rod 106, from left to right in FIG. 2 for retraction and from right to left in FIG. 2 for extension. The result of the sliding is the increase or decrease in the overall length of conductor rod 106 via arm 110, as illustrated in FIG. 1.

Referring now to the left side of FIG. 2, arm 110 also contains a series of concentric conductors of cylindrical or tubular shape. In this example, from the axial center outward, first piston conductor 224 is positioned at a center of arm 110 and is, as with the other tubular conductors of arm 110, made of a metal such as aluminum 6061-T6 or similar substance having high electrical conductivity and high mechanical strength. First piston conductor 224 extends from tip 124 to an arm end 225, shown at the right side of FIG. 2. Being tubular, first piston conductor 224 has a first piston cavity 226 within its inner diameter that is filled with air or another gas. A second piston conductor 228 concentrically surrounds first piston conductor 224 and extends from tip 124 to arm end 225. Second piston conductor 228 is made of a conductive material, and in some examples has an inner diameter of between about 5 and 6 inches. A space defined as second piston cavity 230 is formed between the inner diameter of second piston conductor 228 and the outer diameter of first piston conductor 224, which is left unfilled other than with air or a similar gas.

Moving radially outward from second piston conductor 228, a third piston conductor 232 axially centered on the Y axis concentrically surrounds second piston conductor 228. Similarly made of a conductive material, third piston conductor 232 is set off radially from second piston conductor 228 a distance of less than 1 inch, which is filled with a third piston insulation 234. As with second cylinder insulation 208 and fourth cylinder insulation 216, third piston insulation 234 can be a closed cell polyurethane foam or comparable substance providing electrical insulation and lightweight stability. Finally, an arm shell 236 of conductive material such as metal concentrically surrounds third piston conductor 232 from tip 124 to about arm end 225. In some examples, arm shell 236 has an outer diameter of about 11.625 inches. Within an inner diameter of arm shell 236, an arm shell cavity 238 of free space exists between arm shell 236 and third piston conductor 232.

In some examples, the outer surface of arm shell 236 includes gasket 240, which serves to stably set apart arm shell 236, and arm 110 generally, from barrel shell 218. As illustrated in FIG. 2, as arm 110 is retracted or extended within barrel 109, gasket 240 separates retraction cavity 220 from a barrel shell cavity 242. As well, gasket 240 can help retain arm 110 within conductor rod 106 in a state of maximum extension by butting against stop 222. Additionally, in a manner discussed below, a radial wall of gasket 240 provides leverage for pneumatic pressure applied within retraction cavity 220 to cause arm 110 to be retracted.

As illustrated, FIG. 2 represents an arrangement in which conductor rod 106 essentially has two longitudinal halves. A first half, barrel 109, on the right side of FIG. 2, includes barrel shell 218 enclosing a series of tubular cylinder conductors aligned along the Y axis. Those cylinder conductors, viewed radially from the center axis, are first cylinder conductor 202, second cylinder conductor 206, third cylinder conductor 210, and fourth cylinder conductor 214. Within that concentric arrangement, tubular regions of open space exist within first cylinder cavity 204 and third cylinder cavity 212. Further, barrel shell 218 encases barrel 109 and forms an open space within retraction cavity 220 and barrel shell cavity 242. On the left side of FIG. 2, arm 110 includes arm shell 236 enclosing a series of tubular piston conductors also aligned along the longitudinal axis of conductor rod 106. Those piston conductors, viewed radially from the center axis, are first piston conductor 224, second piston conductor 228, and third piston conductor 232. Within that concentric arrangement, tubular regions of open space exist within first piston cavity 226 and second piston cavity 230. Further arm shell 236 encases arm 110 and forms an open space within arm shell cavity 238.

In an operating state for conductor rod 106, arm 110 is inserted into barrel 109 to form a nested configuration of the piston conductors and the cylinder conductors. The radial sequence of tubular conductors within barrel 109 are the inverse of, and complementary to, the radial sequence of tubular conductors within arm 110. For example, when arm 110 is inserted into barrel 109, the outer diameter of first piston conductor 224 fits within the inner diameter of first cylinder conductor 202, and the empty space within first cylinder cavity 204 enables first piston conductor 224 to slide forward into barrel 109. During and after the sliding, first piston conductor 224 maintains electrical contact with first cylinder conductor 202, permitting electrical conductivity between those tubular conductors. When first piston conductor 224 is mated within first cylinder conductor 202, first piston cavity 226 and first cylinder cavity 204 together form a central passageway axially through conductor rod 106 at least from head 122 to tip 124.

Similarly, when the combination of second piston conductor 228, third piston conductor 232, and interposed third piston insulation 234 are slid as part of arm 110 into barrel 109, the outer diameter of third piston conductor 232 fits within the inner diameter of third cylinder conductor 210, and the inner diameter of second piston conductor 228 fits over the outer diameter of second cylinder conductor 206. As a result, the sandwich of second piston conductor 228, third piston conductor 232, and third piston insulation 234 slide into the empty space defined by third cylinder cavity 212. In doing so, third piston conductor 232 slides against and electrically contacts third cylinder conductor 210, and second piston conductor 228 slides against and electrically contacts second cylinder conductor 206. In some examples, and as shown similarly in FIG. 2, when conductor rod 106 is fully collapsed, at least some volume of empty space will remain within third cylinder cavity 212, which will have an annular or tubular shape and be defined radially by portions of second cylinder conductor 206 and third cylinder conductor 210.

Conversely, when arm 110 is inserted into barrel 109, the cylinder conductors will slide into cavities within the piston from left to right in FIG. 2, and the cylinder conductors will become nested with the piston conductors. For example, the combination of first cylinder conductor 202, second cylinder conductor 206, and second cylinder insulation 208 will slide into the open space defined by second piston cavity 230 within arm 110, during which, as mentioned, first cylinder conductor 202 electrically contacts first piston conductor 224 and second cylinder conductor 206 electrically contacts second piston conductor 228. Likewise, in the illustrated example, the sandwich of third cylinder conductor 210, fourth cylinder conductor 214, and fourth cylinder insulation 216 will slide into the open space defined by arm shell cavity 238 within arm 110. Third cylinder conductor 210 will then slidingly contact third piston conductor 232, and fourth cylinder conductor 214 will do the same against arm shell 236.

Figure 3:
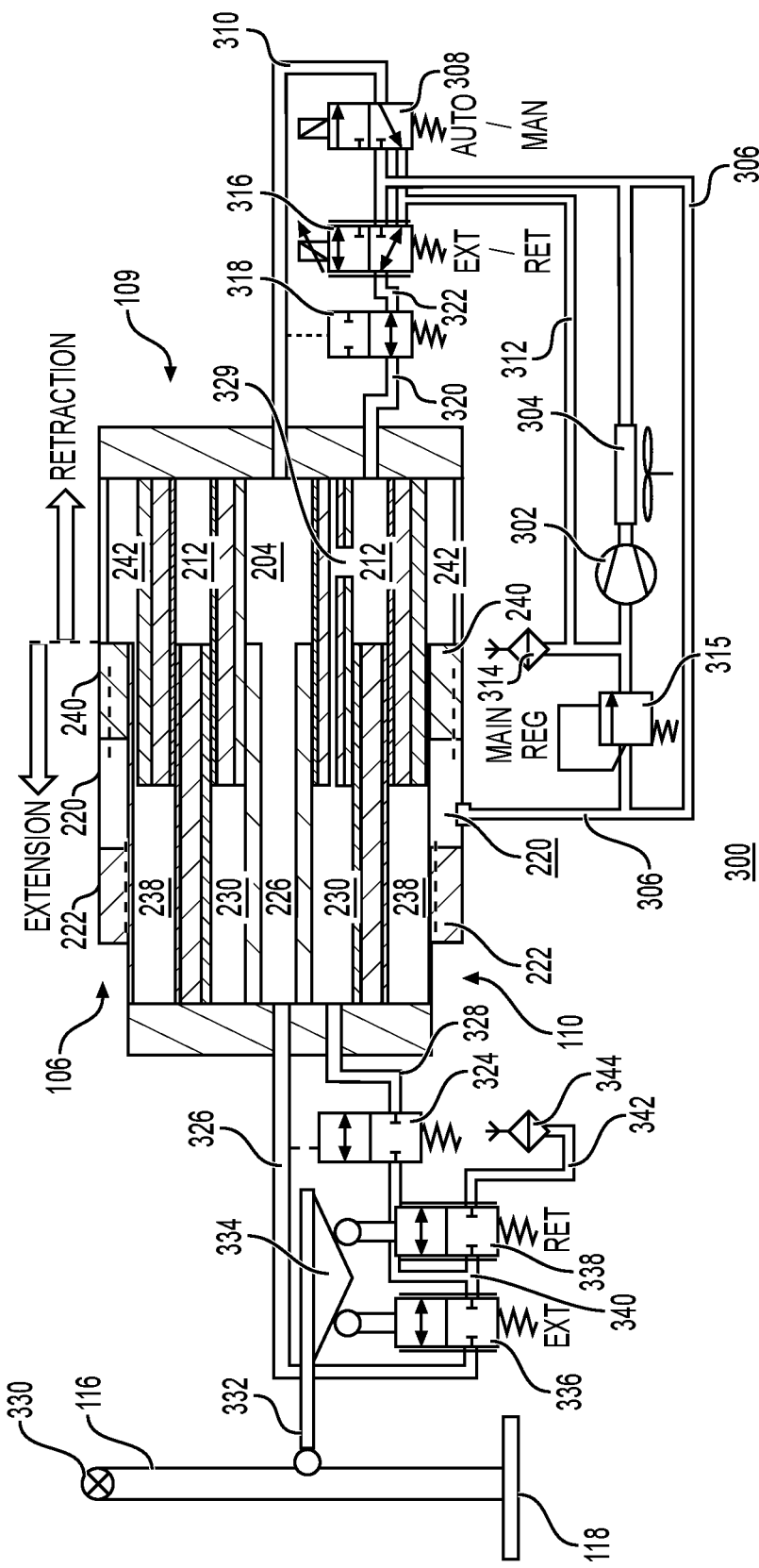
FIG. 3 is a schematic diagram of a pneumatic control circuit for causing axial movement of the conductive rod of FIG. 2 in accordance with an example of the present disclosure.

While FIG. 2 illustrates a longitudinal section of an exemplary conductor rod 106 in which tubular conductors may be slidably nested together, FIG. 3 is a pneumatic control system 300 of a representative arrangement for causing arm 110 to move axially with respect to barrel 109. Namely, pneumatic controls provide a select flow of pressurized air into various cavities of conductor rod 106 to create axial forces on arm 110 so that tip 124 may be stably positioned over power rail 108 before and during movement of work machine 100. The pneumatic controls enable operation in an open-loop control mode and in a closed-loop control mode.

As shown at its center, FIG. 3 schematically illustrates conductor rod 106 from FIG. 2. For simplicity, only cavities are labeled within conductor rod 106. To the right and below conductor rod 106, FIG. 3 shows components related to a pneumatic control circuit configured to cause arm 110 to either retract or extend from within barrel 109 in an open-loop mode. The left of FIG. 3 shows components related to the pneumatic control circuit configured to cause arm 110 to either retract or extend from within barrel 109 in a closed-loop mode based on relative movement between tip 124 and contactor 118, in a manner described below.

For both operational modes, a compressor 302 provides a source of pressurized air for use in pneumatic control. Typically, compressor 302 is mounted within work machine 100, and draws in ambient air from air breather 314 through an air path 312. In one example, compressor 302 is selected with the capability to provide an air flow rate of about 18 CFM. Coupled to the output of compressor 302, a condenser 304, which is also installed on work machine 100, cools and drains condensate from the pressurized air. From condenser 304, the pressurized air is typically fed through hoses or other passageways, such as air path 306, into conductor rod 106, such as through head-end interface 120. A regulator 315 positioned between air path 312 and air path 306 helps maintain nominal air pressure on air path 306.

Pneumatic control system 300 includes the functionality for an operator to select either an open-loop or closed-loop mode of operation for conductor rod 106. In FIG. 3, actuation of a switch, such as a solenoid associated with a pneumatic control valve 308, determines the mode of operation. In some examples, pneumatic control valve 308 is a standard three-port, two-position (3/2) normally closed directional control valve, which is readily available to one of ordinary skill in the art. The pressurized air within air path 306 is fed to an inlet of pneumatic control valve 308. First cylinder cavity 204 of the central passageway of conductor rod 106 is coupled via air path 310 to an outlet of pneumatic control valve 308. An exhaust of pneumatic control valve 308 is connected to air path 312, which leads to atmosphere by way of air breather 314. Pneumatic control valve 308 therefore functions as a switch to connect first cylinder cavity 204 and the central passageway of conductor rod 106 to the atmosphere or to pressurized air. In its default state, pneumatic control valve 308 connects air path 310 to air path 312, exposing the central passageway to the atmosphere, setting pneumatic control system 300 to operate in an open-loop or manual mode of operation dictated largely by the control circuit at the right side of pneumatic control system 300. In its activated state, pneumatic control valve 308 is switched to cause pressurized air within air path 306 to flow into air path 310 and then into first cylinder cavity 204, energizing the left side of pneumatic control system 300 and activating a closed-loop or feedback mode of operation at the distal end of conductor rod 106.

For either mode of operation, the extension or retraction of arm 110 in the example of FIG. 3 is governed largely by the radial surface areas within the annular or tubular-shaped volumes of retraction cavity 220, third cylinder cavity 212, and second piston cavity 230. For retraction, pressurized gas within retraction cavity 220 from air path 306 causes a force to act on the radial surface of gasket 240, pushing arm 110 axially into barrel 109, i.e., in the direction of the −Y axis. While not shown in FIG. 2, third cylinder cavity 212 and second piston cavity 230 are pneumatically connected by way of passage 329 within second cylinder insulation 208 (FIG. 3). As a result, pressurized gas within either of these cavities flows into the other and causes axial forces to press on the radial surfaces of third cylinder cavity 212 and second piston cavity 230. These forces tend to push arm 110 axially out from barrel 109, i.e., in the direction of the +Y axis. The balance or difference between the retraction forces in retraction cavity 220 and the extension forces within third cylinder cavity 212 and second piston cavity 230 lead to the direction of axial movement for arm 110. In some examples, the radial surface area of third cylinder cavity 212 and second piston cavity 230, which are each annular in shape, is selected to be about twice that of the radial surface area of retraction cavity 220.

Referring first to the open-loop mode, pneumatic control valve 318 and pneumatic control valve 324 serve as gates to open third cylinder cavity 212 and second piston cavity 230 as possible extension cavities. Pneumatic control valve 318 and pneumatic control valve 324 are standard two-port, two-position (2/2) pressure control valves readily available in the market. Pneumatic control valve 318 is normally closed, and when air path 310 is not under pressure, air path 322 at the inlet of pneumatic control valve 318 is connected to air path 320 at its outlet. Conversely, pneumatic control valve 324 is normally open. Therefore, when pneumatic control valve 324 is not under pressure, as when pneumatic control valve 308 indicates an open-loop mode by connecting air path 310 to air path 312, pneumatic control valve 324 prevents the passage of gas between its outlet at air path 328 and its inlet at air path 340. Accordingly, for the example of FIG. 3, when an open-loop mode is selected at pneumatic control valve 308, second piston cavity 230 is sealed by pneumatic control valve 324 and connected by passage 329 to third cylinder cavity 212, and third cylinder cavity 212 is unsealed by pneumatic control valve 318.

Extension and retraction of arm 110 in an open-loop mode is directed by pneumatic control valve 316, which is a standard three-port, two-position (3/2) proportional directional control valve that is normally closed. Without any interaction from an operator, pneumatic control valve 316 will connect air path 322 at its output to air path 312 at its exhaust and allow air from third cylinder cavity 212 and second piston cavity 230 to pass to the atmosphere via air breather 314. As such, the cavities within conductor rod 106 will not provide substantial forces from air pressure to resist the retraction forces applied within retraction cavity 220. Consequently, arm 110 will move axially into barrel 109. Thus, pneumatic control system 300 by default includes a fail-safe feature by causing arm 110 to retract within barrel 109 due to the air pressure in retraction cavity 220 causing a force against gasket 240 that urges arm 110 axially into barrel 109, i.e., to retract within work machine 100.

In the example illustrated, an operator can manually control extension and retraction of arm 110 by activating the proportional solenoid on pneumatic control valve 316. With that activation, pneumatic control valve 316 exposes air path 322 to air path 306, passing amounts of pressurized gas proportional to activation of pneumatic control valve 316 through pneumatic control valve 318 and into third cylinder cavity 212 and second piston cavity 230. With minimal activation, the amount of pressurized gas provided to third cylinder cavity 212 and second piston cavity 230 will not generate axial forces in those cavities sufficient to offset the axial forces within retraction cavity 220, such that arm 110 will retract as it would in a default situation. Increasing the actuator position for pneumatic control valve 316 will increase the amount of pressurized gas provided to third cylinder cavity 212 and second piston cavity 230, and retraction of arm 110 will slow to a point, when the actuator is near its median position in some examples, that the forces of retraction and extension will equal each other and the axial movement of arm 110 will stop. As the actuator of pneumatic control valve 316 is adjusted beyond its median position in some examples, the air flow into third cylinder cavity 212 and second piston cavity 230 will increase and the pressure in third cylinder cavity 212 and second piston cavity 230 will become sufficient that the axial forces in those cavities will overcome the opposing axial forces in retraction cavity 220 and extension of arm 110 outward from conductor rod 106 will begin. As extension occurs, air will be pushed out of retraction cavity 220 and combined in air path 306 with air provided from compressor 302, resulting in regenerative feedback from retraction cavity 220.

An operator may proportionally adjust the actuation of pneumatic control valve 316 to cause controlled extension or retraction of arm 110 until tip 124 is located laterally away from work machine 100 as desired by the operator. At this point, the air flow through pneumatic control valve 316 may be adjusted until the forces sourced by air path 320 axially expanding second piston cavity 230 and third cylinder cavity 212 to cause extension are balanced by the forces sourced by air path 306 axially expanding retraction cavity 220 to cause retraction. Arm 110 will then be in a steady state and fixed axial position. An example of this steady state position could be to locate tip 124 and contactor 118 over power rail 108 for connection of work machine 100 to receive electrical power.

After adjusting the position of arm 110 in an open-loop mode, an operator can turn on a closed-loop, or automatic, mode of operation by activating a solenoid on pneumatic control valve 308. In some examples, the closed-loop mode of operation involves maintaining an axial position of arm 110 with respect to an external reference point, such as with respect to contactor 118 on power rail 108 as work machine 100 moves along haul route 101. For instance, referring to FIG. 1 and the left side of FIG. 3, trailing arms 116 are connected to arm 110 at one end and connected to contactor 118 at an opposite end. A pivot 330 enables trailing arms 116 to swing laterally, i.e., along the Y axis, as a relative position between contactor 118 and arm 110 changes along the Y axis. If work machine 100 veers a lateral distance away from power rail 108, i.e., along the −Y axis, contactor 118 will "move" a proportional distance in the opposite direction, i.e., along the +Y axis. That relative movement may present a risk that contactor 118 will become detached from power rail 108. In the closed-loop mode of operation, pneumatic control system 300 can compensate for the changes in lateral position by automatically extending or retracting arm 110 an opposite amount.

In particular, for the example of FIG. 3, a linkage 332 in pneumatic control system 300 is coupled to trailing arms 116 and is configured to move horizontally in proportion to the lateral movement of contactor 118 and trailing arms 116. Linkage 332, which includes a double-wedge cam 334, can be used with pneumatic control valve 336 and pneumatic control valve 338 to compensate for changes in lateral movement of the reference point represented by contactor 118. Pneumatic control valve 336 and pneumatic control valve 338 are standard two-port, two-position (2/2) proportional pressure control valves that are normally closed. Each of pneumatic control valve 336 and pneumatic control valve 338 is mechanically actuated by a lever that follows a respective angled face of double-wedge cam 334, as illustrated in FIG. 3. As pneumatic control valve 336 and pneumatic control valve 338 are normally closed, second piston cavity 230 and third cylinder cavity 212 remain isolated. However, if trailing arms 116 and linkage 332 move to the left in FIG. 3, pneumatic control valve 336 becomes activated proportional to the movement and exposes pressurized air on air path 326 to pass to air path 340 and into second piston cavity 230 and third cylinder cavity 212. This addition of pressurized air will change the balance between extension forces in second piston cavity 230 and third cylinder cavity 212 on the hand, and retraction forces in retraction cavity 220 on the other hand, leading to gradual extension of arm 110. As arm 110 is extended, trailing arms 116 will be pivoted back to the right in FIG. 3 to compensate for its previous leftward movement. When contactor 118 returns to a position aligned with tip 124, linkage 332 will be in a horizontal position such that double-wedge cam 334 will have moved rightward and again closed pneumatic control valve 336. The feedback system enables the automatic adjustment of the length for conductor rod 106 to compensate relative movements between contactor 118 and work machine 100.

Similarly, if after contactor 118 is connected with power rail 108, work machine 100 moves closer to power rail 108, i.e., to the left in FIG. 3, then contactor 118 and trailing arms 116 will swing to the right. As linkage 332 likewise moves to the right, double-wedge cam 334 will activate pneumatic control valve 338, which will proportionally exhaust some of the pressurized air in second piston cavity 230 to the atmosphere through air path 342 and air breather 344. The loss of air from second piston cavity 230 will change the balance of axial forces within the cavities of conductor rod 106 such that the retraction forces in retraction cavity 220 will cause arm 110 to begin retracting. As arm 110 is retracted, trailing arms 116 will be pivoted back to the left in FIG. 3 to compensate for its previous rightward movement. When contactor 118 returns to a position aligned with tip 124, linkage 332 will be in a horizontal position such that double-wedge cam 334 will have moved leftward and again caused pneumatic control valve 338 to close.

The use of two components in pneumatic control valve 336 and pneumatic control valve 338 for following two faces of double-wedge cam 334 gives more fidelity for mechanically tuning the feedback system compared with using a single valve. While the faces of double-wedge cam 334 are shown as straight angles, the surfaces may be arcuate or have other shapes to achieve a desired feedback response. A mechanical linkage as shown in FIG. 3 provides rapid assessment and correction of positional changes for contactor 118, but alternative sensors could also be employed. For instance, electronic devices may be used to determine relative movement of a reference point such as contactor 118 and to compensate for the movement, although their response time may be longer.

In addition, the use of pneumatic control valve 318 and air path 326, together with pneumatic control valve 308, provide a safety feature for conductor rod 106 and work machine 100. In particular, the use of pneumatic control valve 308 to switch from an open-loop mode to a closed-loop mode, causes pneumatic control valve 318 to isolate air path 320 from air path 322. As a result, if a change is made to pneumatic control valve 316 accidentally during closed-loop mode, movement of arm 110 in the open-loop mode will not occur.

Figure 4:
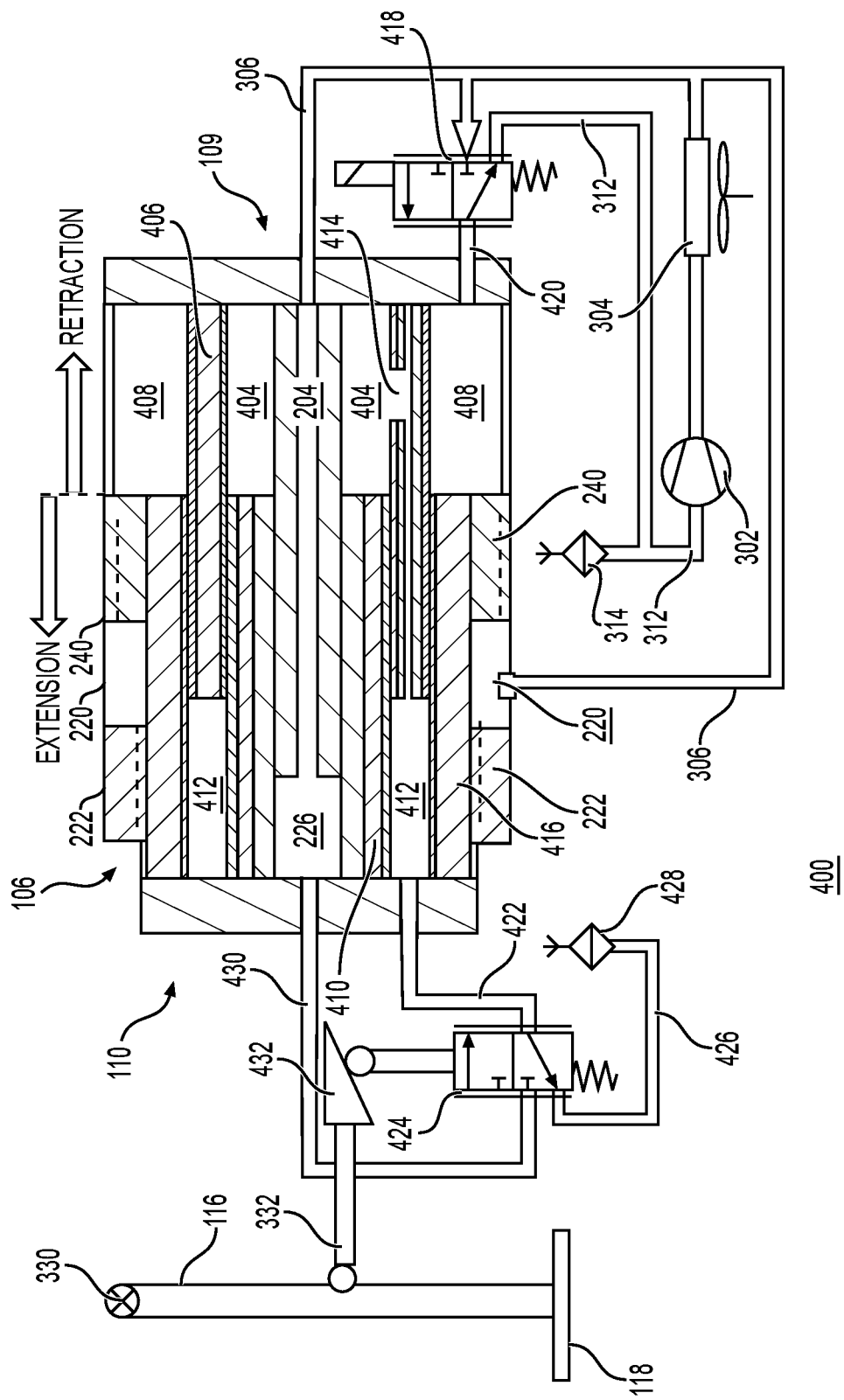
FIG. 4 is a schematic diagram of another pneumatic control circuit for causing axial movement of an alternative conductive rod in accordance with an example of the present disclosure

FIG. 4 illustrates another example of a pneumatic control system 400 in a representative arrangement for causing arm 110 to move axially within barrel 109. FIG. 4 depicts an alternate arrangement of tubular conductors and cavities within barrel 109 and arm 110 for conductor rod 106 compared with the longitudinal section in FIG. 2 and the schematic diagram of FIG. 3. In essence, the tubular conductors within barrel 109 and arm 110 are inverted or switched from each other in FIG. 4 compared to the example in FIGS. 2 and 3. For instance, while FIGS. 2 and 3 depict two tubes of insulation at second cylinder insulation 208 and fourth cylinder insulation 216 within barrel 109, FIG. 4 shows that arm 110 has the two tubes of insulation at second piston insulation 410 and piston shell insulation 416. Similarly, in FIGS. 2 and 3, arm 110 has one insulation layer at third piston insulation 234, while in FIG. 4, barrel 109 has the one layer of insulation at third cylinder insulation 406. Consequently, with respect to cavities available for forcing extension of barrel 109 pneumatically, barrel 109 in FIG. 4 has a central passageway formed by first cylinder cavity 204 and first piston cavity 226 as well as second cylinder cavity 404 and barrel shell cavity 408, while arm 110 has third piston cavity 412.

While having generally the same principles of operation as pneumatic control system 300 in FIG. 3, pneumatic control system 400 has fewer components and operates its open-loop and closed-loop modes simultaneously. For instance, to the right and below conductor rod 106 in FIG. 3, components related to a pneumatic control circuit configured to cause arm 110 to either retract or extend from within barrel 109 in an open-loop mode are shown. Compressor 302, condenser 304, and air breather 314 operate similarly to FIG. 4, resulting in pressurized air being fed through air path 306 to retraction cavity 220. As such, the pressurized air into retraction cavity 220 causes retraction as a fail-safe and default configuration. Pneumatic control system 400 in some examples also feeds pressurized air via air path 306 in the central passageway of conductor rod 106 formed by first cylinder cavity 204 and first piston cavity 226. As a result, the arrangement in pneumatic control system 400 provides pneumatic energy to the left of conductor rod 106 in FIG. 4 for use remotely from work machine 100 at tip 124, such as for a closed-loop mode of operation described below.

In some examples, barrel shell cavity 408 and third piston cavity 412 cooperate to control axial movement of arm 110 with respect to barrel 109. Barrel shell cavity 408 is an annular or tubular-shaped space with a volume related to the distance of insertion of arm 110 into barrel 109. Pneumatic control valve 418, which is readily available to one of ordinary skill in the art, is a standard three-port, two position (3/2) proportional directional control valve that is normally closed. In the arrangement illustrated, pneumatic control valve 418 controls access of barrel shell cavity 408 to either atmospheric air or pressurized air. Specifically, in its default condition, pneumatic control valve 418 has its outlet connected to its exhaust, which couples air path 420 and barrel shell cavity 408 to atmospheric pressure via air path 312 and air breather 314. In this condition, the axial forces generated by pressurized air within retraction cavity 220 will cause retraction of arm 110. An actuator for the solenoid associated with pneumatic control valve 418 may be modified to proportionally adjust the exposure of the pressurized air in air path 306 at the inlet of pneumatic control valve 318 to air path 420 at the outlet. As pressurized air is provided to barrel shell cavity 408 circumferentially around barrel 109, axial forces within barrel shell cavity 408 may eventually equal the axial forces acting in retraction cavity 220. In that situation, conductor rod 106 will be held in a stationary position axially. If adjustment of pneumatic control valve 418 leads to the axial forces within barrel shell cavity 408 exceeding the axial forces within retraction cavity 220, arm 110 will move axially outward from barrel 109. Variation of the air flow through pneumatic control valve 418 and the axial movement of arm 110 can be used to adjust the position of arm 110, such as tip 124, laterally from work machine 100. The adjustment can be done, for example, to align contactor 118 for connection to power rail 108 to provide electrical power to work machine 100.

As mentioned and shown, air path 306 delivers pressurized air through first cylinder cavity 204 and first piston cavity 226, i.e., through a central passageway in conductor rod 106, to air path 430. At this location, the pressurized air delivered through conductor rod 106 may be used for variety of purposes, such as providing pneumatic controls to adjust trailing arms 116 or contactor 118. As well, the pressurized air in air path 430, together with pneumatic control valve 424, third piston cavity 412, and second cylinder cavity 404 may be used to adjust the axial position of arm 110 in a closed-loop mode of operation. Third piston cavity 412 and second cylinder cavity 404 are pneumatically connected through passage 414 that extends between them within third cylinder insulation 406. The radial areas within third piston cavity 412 and second cylinder cavity 404 exceed the radial areas within retraction cavity 220, such that axial forces in the combined volumes of third piston cavity 412 and second cylinder cavity 404 can be made larger than the axial forces in retraction cavity 220 to cause extension. Pneumatic control valve 424 a standard three-port, two position (3/2) proportional directional control valve that is normally closed. In its default condition, pneumatic control valve 424 couples air path 422, along with third piston cavity 412 and second cylinder cavity 404, to the atmosphere by way of air path 426 and air breather 428. In its activated condition, pneumatic control valve 424 will couple third piston cavity 412 and second cylinder cavity 404 to pressurized air within air path 430. As a proportional device, pneumatic control valve 424 may provide a gradual adjustment or mixing between air path 430, air path 426, and air path 422.

As discussed above with respect to FIG. 3, a linkage 332 in FIG. 4 may be coupled to trailing arms 116 and configured to move horizontally in proportion to the lateral movement of contactor 118 and trailing arms 116. Linkage 332, which includes a wedge-shaped cam 432, can be used with pneumatic control valve 424 to compensate for changes in lateral movement of the reference point represented by contactor 118. In some examples, pneumatic control valve 424 is mechanically actuated by a lever that follows an angled face of wedge-shaped cam 432. If trailing arms 116 and linkage 332 move to the left in FIG. 4, i.e., conductor rod 106 moves along the Y axis in FIG. 1, pneumatic control valve 424 becomes activated proportional to the movement and exposes pressurized air on air path 430 into air path 422, and thus into third piston cavity 412 and second cylinder cavity 404. This addition of pressurized air will change the balance between extension forces in third piston cavity 412 and second cylinder cavity 404 and retraction forces in retraction cavity 220, leading to gradual extension of arm 110. As arm 110 is extended, trailing arms 116 will be pivoted back to the right in FIG. 4 to compensate for its previous leftward movement. When contactor 118 returns to a position aligned with tip 124, linkage 332 will be in a horizontal position such that wedge-shaped cam 432 will have moved rightward and decreased the opening of pneumatic control valve 424 with respect to air path 430. The feedback system enables the automatic adjustment of the length for conductor rod 106 to compensate relative movements between contactor 118 and work machine 100.

Similarly, if after contactor 118 is connected with power rail 108, work machine 100 moves closer to power rail 108, i.e., to the left in FIG. 4, then contactor 118 and trailing arms 116 will swing to the right. As wedge-shaped cam 432 likewise moves to the right, wedge-shaped cam 432 will cause pneumatic control valve 424 to proportionally exhaust some of the pressurized air in third piston cavity 412 to the atmosphere through air path 422 and air path 426. The loss of air from third piston cavity 412 will change the balance of axial forces within the cavities of conductor rod 106 such that the retraction forces in retraction cavity 220 will cause arm 110 to begin retracting. As arm 110 is retracted, trailing arms 116 will be pivoted back to the left in FIG. 4 to compensate for its previous rightward movement. When contactor 118 returns to a position aligned with tip 124, linkage 332 will be in a horizontal position such that wedge-shaped cam 432 will have moved leftward and again caused pneumatic control valve 424 to adjust the flow of air between air path 430, air path 422, and air path 426.

Accordingly, pneumatic control system 400 enables pneumatic control of axial movement for arm 110 within barrel 109 for both open-loop and closed-loop modes of operation. With a device such as pneumatic control valve 418, an operator can move tip 124 of arm 110 into position in open-loop mode for connection of contactor 118 to power rail 108. After electrical power flows and work machine 100 moves, pneumatic control system 400 provides closed-loop control over the axial position of arm 110 to help maintain connection between contactor 118 and power rail 108. Variations to pneumatic control system 400 consistent with the disclosed principles will be apparent to those skill in the art. For instance, the cavities selected for open-loop extension (barrel shell cavity 408) and for closed-loop extension (third piston cavity 412 and second cylinder cavity 404) could be changed. Moreover, the pneumatic controls may be altered or added to for different performance characteristics. As well, pressurized air flowing from head 122 to tip 124 within conductor rod 106 could be used at the distal end of conductor rod 106 to energize functions other than closed-loop axial movement of arm 110. In addition, more or fewer conductors and cavities between them may be selected based on the particular implementation.

Figure 5:
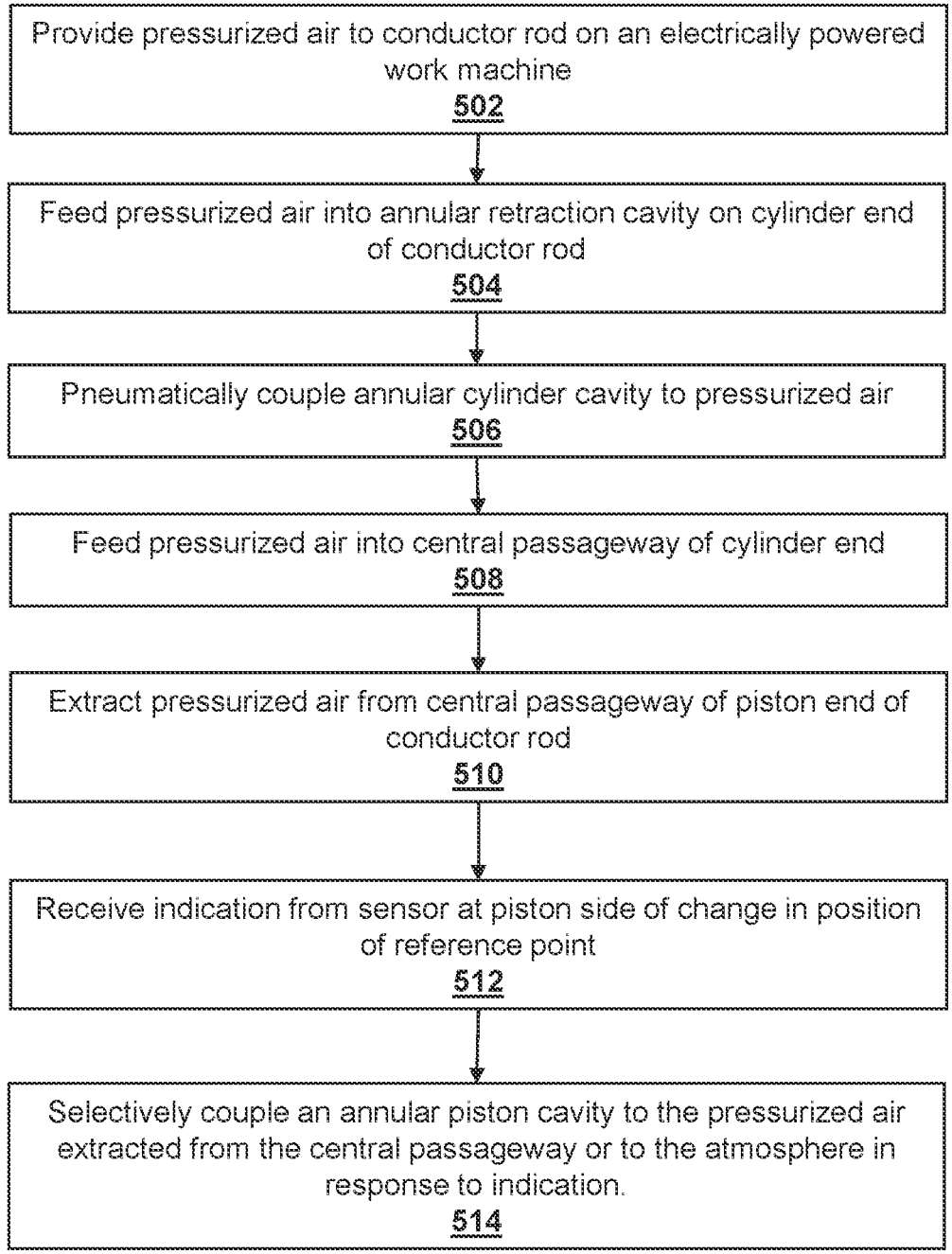
FIG. 5 is a flow chart depicting a method of axially moving the conductive rod as in FIG. 3 in accordance with an example of the present disclosure.

Turning from pneumatic control systems for conductor rod 106 as illustrated in FIGS. 3 and 4 to methods for operating those systems, FIG. 5 is a flowchart of representative steps for controlling axial movement of conductor rod 106 consistent with the present disclosure. Generally embodied as 500 in FIG. 5, the method begins with a step 502 of providing pressurized air from a compressor within a work machine to a conductor rod on the work machine. The work machine is to be energized by electrical power, and the conductor rod is configured to provide the electrical power from outside the work machine. Thereafter, method 500 involves causing a piston that is slidingly engaged within a pneumatic cylinder of the conductor rod to retract along a longitudinal axis into the pneumatic cylinder in an open-loop mode. The pneumatic cylinder includes cylinder tubes concentrically positioned around a central passageway, and the piston includes piston tubes concentrically positioned around the central passageway and radially offset from the cylinder tubes.

In more particular steps of method 500, the pressurized air is fed (step 504) into an annular retraction cavity on a cylinder end of the conductor rod and an annular cylinder cavity is pneumatically coupled (step 506) to the pressurized air. As explained in more detail for examples above, the annular retraction cavity is positioned between an inner wall of the pneumatic cylinder and an outer wall of the piston. In addition, the annular cylinder cavity is positioned near a base of the conductive rod proximate the work machine and is bounded in the pneumatic cylinder by successive cylinder tubes and a piston tube slidably mated between the successive cylinder tubes.

Further steps of method 500 involve feeding pressurized air into a central passageway of the cylinder end of the conductor rod (step 508) and extracting the pressurized air from the central passageway of the piston end of the conductor rod (step 510). Accordingly, pressurized air is provided at a distal end of the conductor rod, possibly at a side of haul route 101 when arm 110 is extended.

After work machine 100 receives electrical power through the conductor rod, the method may continue in receiving an indication from a sensor at the piston side of the conductor rod of a change in position of a reference point. Typically, the reference point is relative to a tip and remote from the conductor rod (step 512). Finally, method 500 entails a step 514 where, in response to the indication from the sensor, an annular piston cavity is selectively coupled to the pressurized air extracted from the central passageway or to the atmosphere. Accordingly, the conductive rod is caused to change in length in a closed-loop mode, and a position of a tip of the conductive rod is controlled to continue a secure contact with a source of electrical power for the work machine.

It will be understood that descriptions of an operator activating one or more solenoids associated with directional control valves for causing extension or retraction of arm 110 with respect to barrel 109 will include several possible implementations. For instance, the operator or similar personnel could directly adjust one or more of the solenoids manually. In other examples, an electronic controller, processor, or similar device provides electronic signals for causing adjustment to the one or more solenoids. The controller may be an electronic control module (not shown) that executes a plurality of electronic control functions within work machine 100 either automatically under control of software instructions or on demand in response to electronic input from an operator or other individual associated with work machine 100.

Those of ordinary skill in the field will appreciate that the principles of this disclosure are not limited to the specific examples discussed or illustrated in the figures. For example, while the examples illustrate pressurized air supplied to certain cavities within barrel 109 and arm 110, the pressurized air could be supplied to different ones of the cavities within those sections. Similarly, while angular surfaces on double-wedge cam 334 and wedge-shaped cam 432 are illustrated, curved surfaces or other configurations for those cams to optimize feedback from trailing arms 116 could be used. Likewise, the particular components for the open-loop and closed-loop controls are within the knowledge and selection of those of ordinary skill in the art working from the present disclosure. In addition, the principles disclosed are not limited to implementation on a work machine. Any moving vehicle deriving electrical power from a ground-based conductor rail could benefit from the examples and techniques disclosed and claimed.

Industrial Applicability

The present disclosure provides a work machine powered electrically by a conductor rod and a pneumatic control system for moving the conductor rod axially for contact with power rails along the side of a haul route. The conductor rod has a barrel with an extendable arm axially moveable within the barrel. Both the barrel and the arm have tubular-shaped concentric conductors that slide against each other as the arm moves axially and maintain electrical conductivity for the electrical power from the power rails to the work machine. An axial passageway of open space passes through the centermost tubular-shaped conductors. Voids between selected conductors in the barrel and in the arm are filled with insulation so that a radial interface between the arm and the barrel is substantially solid, but for the axial passageway. Arrangements of pneumatic control valves provide pressurized air to selected cavities formed at ends or sides of the tubular-shaped conductors, causing axial forces that are balanced to effect retraction and extension of the arm.

As noted above with respect to FIGS. 1-5, an example work machine that is electrically powered generally includes an electric engine, an air compressor, and a conductor rod 106. The conductor rod 106 has a central passageway along a longitudinal axis pneumatically coupling a head 122 to a tip 124. A barrel 109 extending from head 122 toward tip 124 has cylinder tubes concentrically positioned around the central passageway and cylinder cavities between the cylinder tubes. An arm 110 extending from tip 124 toward head 122 has piston tubes concentrically positioned around the central passageway and piston cavities, where the cylinder tubes are radially offset from the piston tubes and arm 110 is slidably mated with barrel 109. Pressurized air is fed to a retraction cavity 220 enclosed between an inner surface of arm 110 and an outer surface of barrel 109. One or more directional control valves, such as pneumatic control valve 316 are configured, in a default state, to couple one of the cylinder cavities to atmosphere and, in an active state, to couple the one of the cylinder cavities to pressurized air for extending the arm 110.

In the examples of the present disclosure, pneumatic control system 300 and pneumatic control system 400 enable axial movement of arm 110 with respect to barrel 109. In an open-loop mode, the pneumatic controls provide pressurized air to retraction cavity 220 and then permit an operator to introduce pressurized air to one or more expansion cavities, such as third cylinder cavity 212 and barrel shell cavity 408. If the axial forces in the expansion cavities exceed the opposing axial forces in retraction cavity 220, arm 110 will extend, and a tip 124 can be positioned for connecting contactor 118 to power rail 108 to obtain electrical power for work machine 100. In a closed-loop mode, pneumatic control system 300 and pneumatic control system 400 accept mechanical feedback regarding lateral movement of contactor 118 relative to arm 110 and pneumatically adjust the axial position of conductor rod 106 to compensate for the movement. Accordingly, the pneumatic control system enables accurate attachment of conductor rod 106, which may be several meters in length, to power rail 108 and ensures continued connection of work machine 100 to its source of electrical power. In particular, as work machine 100 may veer from power rail 108 along haul route 101, the pneumatic control systems automatically compensate by adjusting the axial length of conductor rod 106. As a result, supply of electrical power is maintained to work machine 100 despite deviations in lateral positioning caused by steering, road conditions, or positions of power rail 108. In addition, various fail-safe features within pneumatic control system 300 and pneumatic control system 400 ensure that arm 110 safely retracts into barrel 109 and that inadvertent axial movements of barrel 109 are avoided while work machine 100 is moving.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A work machine, comprising:
   an electric engine;
   an air compressor;
   a conductor rod, extending along a longitudinal axis, from a first end proximate the work machine to a second end spaced laterally from the work machine, the conductor rod comprising:
      a central passageway extending circumferentially around the longitudinal axis and pneumatically coupling the first end to the second end,
      a first cylindrical shell extending from the first end toward the second end and having a first diameter,
      a first stop attached to the first cylindrical shell,
      a first sequence of first conductive tubes and first tubular cavities concentrically positioned alternatingly around the central passageway, the first conductive tubes extending from the first end,
      a second cylindrical shell extending from the second end toward the first end and having a second diameter different from the first diameter,
      a second stop attached to the second cylindrical shell,
      a second sequence of second conductive tubes and second tubular cavities concentrically positioned alternatingly around the central passageway, the second conductive tubes extending from the second end, wherein
         the first cylindrical shell and the second cylindrical shell are slidably mated along the longitudinal axis,
         the first conductive tubes are slidable into the second tubular cavities, and
         the second conductive tubes are slidable into the first tubular cavities; and
      a retraction cavity positioned between the first cylindrical shell and the second cylindrical shell, and between the first stop and the second stop;
   a channel from the air compressor to at least the retraction cavity; and
   an open-loop directional control valve configured, in a default state, to couple a first cavity of the first tubular cavities to atmosphere and, in an active state, to couple the first cavity to the channel.

2. The work machine of claim 1, further comprising an override directional control valve configured, in a default state, to couple the central passageway to the atmosphere and, in an activated state, to couple the central passageway to the channel for pressurized air.

3. The work machine of claim 1, further comprising a conduit extending through one of the first conductive tubes, the conduit pneumatically connecting one of the first tubular cavities with one of the second tubular cavities.

4. The work machine of claim 1, further comprising:
   a pathway into the central passageway; and
   a closed-loop directional control valve located longitudinally beyond the second end and configured to couple one of the second tubular cavities to the pathway or to the atmosphere.

5. The work machine of claim 4, further comprising a sensor disposed longitudinally beyond the second end, the sensor detecting a change in position of a reference point remote from the conductor rod relative to the second end.

6. The work machine of claim 5, wherein the sensor comprises a mechanical linkage between the reference point and a cam, and an actuator on the closed-loop directional control valve follows movement of the cam.

7. The work machine of claim 6, wherein the cam has a first surface and a second surface, and wherein the closed-loop directional control valve responds to the movement of the cam via the first surface and a second closed-loop directional control valve responds to the movement of the cam via the second surface.

8. The work machine of claim 5, wherein the reference point is a contactor coupled to a power rail alongside the work machine.

9. An apparatus for conducting electrical power to a work machine, comprising a conductor rod extending from a base to a tip, the conductor rod comprising:
   a central passageway around a longitudinal axis pneumatically connecting the base to the tip;
   a pneumatic cylinder extending from the base toward the tip and terminating at a cylinder end, the pneumatic cylinder comprising:
      cylinder tubes concentrically positioned around the central passageway and extending from the base to proximate the cylinder end, the cylinder tubes comprising conductive material for conducting the electrical power, and
      cylinder cavities between the cylinder tubes;
   a piston extending from the tip toward the base and terminating at a piston end, the piston comprising:
      piston tubes concentrically positioned around the central passageway and extending from the tip to proximate the piston end, the piston tube comprising conductive material for conducting the electrical power, wherein the cylinder tubes are radially offset from the piston tubes and the piston is slidably mated within the pneumatic cylinder, and
      piston cavities between the piston tubes;

a retraction cavity enclosed between an inner surface of the pneumatic cylinder and an outer surface of the piston;

an open-loop directional control valve configured to couple at least one of the cylinder cavities to a first inlet or couple the at least one of the cylinder cavities to atmosphere; and a channel coupled to the first inlet, to the retraction cavity, and to the central passageway.

10. The apparatus of claim 9, further comprising a cylinder stop around the inner surface of the pneumatic cylinder adjacent the cylinder end and a piston stop around the outer surface of the piston adjacent the piston end.

11. The apparatus of claim 9, wherein a default state of the open-loop directional control valve couples the at least one of the cylinder cavities to the atmosphere, and pressurized air in the retraction cavity causes the piston to retract into the pneumatic cylinder along the longitudinal axis.

12. The apparatus of claim 11, wherein an active state of the open-loop directional control valve couples the first inlet to at least one of the cylinder cavities, and the pressurized air in the at least one of the cylinder cavities causes the piston to extend from the pneumatic cylinder along the longitudinal axis.

13. The apparatus of claim 9, further comprising an override directional control valve configured, in a default state, to couple the central passageway to the atmosphere and, in an activated state, to couple the central passageway to the channel.

14. The apparatus of claim 9, further comprising:
a pathway into the central passageway; and
a closed-loop directional control valve disposed longitudinally beyond the tip and configured to couple one of the piston cavities to the pathway or to the atmosphere.

15. A method, comprising:
providing pressurized air from a compressor within a work machine to a conductor rod on the work machine, the work machine to be energized by electrical power, the conductor rod to provide the electrical power from outside the work machine; and causing a piston, slidingly engaged within a pneumatic cylinder of the conductor rod, to extend along a longitudinal axis from the pneumatic cylinder in an open-loop mode, the pneumatic cylinder including cylinder tubes concentrically positioned around a central passageway, the piston including piston tubes concentrically positioned around the central passageway and radially offset from the cylinder tubes, the causing the piston to extend comprising:

feeding the pressurized air into an annular retraction cavity of the conductor rod, the annular retraction cavity being positioned between an inner wall of the pneumatic cylinder and an outer wall of the piston, and pneumatically coupling an annular cylinder cavity to the pressurized air, the annular cylinder cavity being positioned near a base of the conductive rod proximate the work machine and being bounded in the pneumatic cylinder by successive cylinder tubes and a piston tube slidably mated between the successive cylinder tubes, wherein an extension area around a first radial surface in the annular cylinder cavity is larger than a retraction area around a second radial surface in the annular retraction cavity.

16. The method of claim 15, further comprising:
causing the piston to retract along the longitudinal axis into the pneumatic cylinder in the open-loop mode, comprising:

decoupling the annular cylinder cavity from the pressurized air; and pneumatically coupling the annular cylinder cavity to atmosphere.

17. The method of claim 15, wherein causing the piston to extend comprises adjusting a length of the conductor rod until a contactor, coupled to a tip of the conductor rod through trailing arms, connects with a power rail supplying the electrical power.

18. The method of claim 16, further comprising:
causing the conductive rod to change in length in a closed-loop mode, comprising:

feeding the pressurized air into the central passageway within the pneumatic cylinder;

extracting the pressurized air from the central passageway within the piston;

receiving an indication from a sensor of a change in position of a reference point relative to a tip of the conductor rod; and in response to the indication, selectively coupling an annular piston cavity to the pressurized air extracted from the central passageway or to the atmosphere, the annular piston cavity being positioned distal to the work machine and being bounded in the piston by successive piston tubes and a cylinder tube slidably mated between the successive piston tubes.

19. The method of claim 18, wherein feeding the pressurized air into the central passageway comprises activating an automatic control valve, the activating comprising, at the pneumatic cylinder, decoupling the central passageway from the atmosphere and coupling the central passageway to the pressurized air.

20. The method of claim 18, wherein the reference point is a position of a contactor, coupled to the tip through trailing arms, connected with a power rail for supplying the electrical power to the work machine.

* * * * *